June 9, 1936.  F. B. STOVER  2,043,632
REMOTE CONTROL FOR HIGH PRESSURE TANKS
Filed July 13, 1931
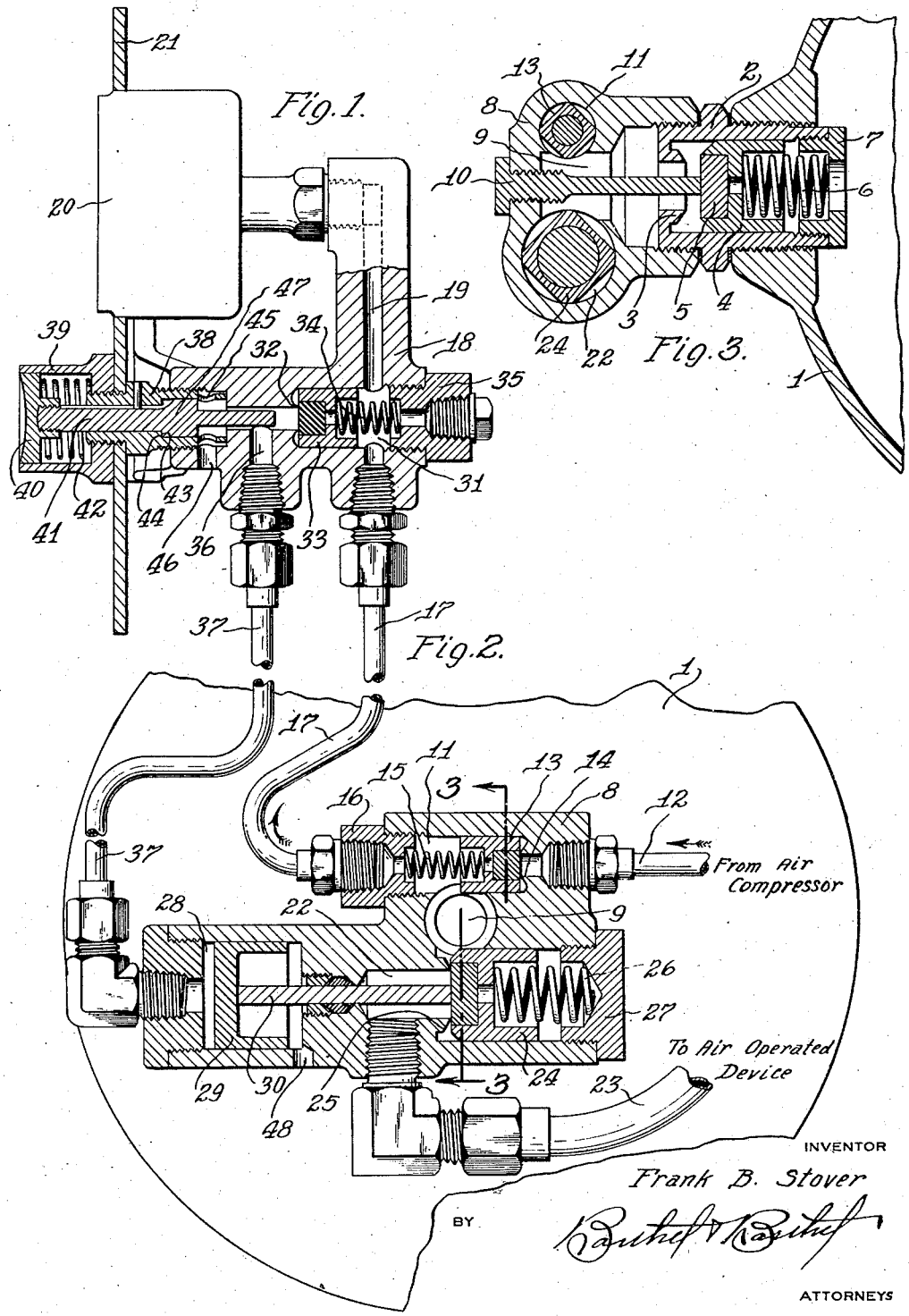
INVENTOR
Frank B. Stover
BY
ATTORNEYS Patented June 9, 1936

2,043,632

UNITED STATES PATENT OFFICE 2,043,632

REMOTE CONTROL FOR HIGH PRESSURE TANKS

Frank B. Stover, Detroit, Mich., assignor, by mesne assignments, to Eclipse Aviation Corporation, East Orange, N. J., a corporation of New Jersey Application July 13, 1931, Serial No. 550,504

3 Claims. (Cl. 137—139)

The present invention pertains to a novel device for controlling the discharge of fluid from a tank containing such fluid under high pressure. A typical installation consists of a tank charged by a compressor and adapted to discharge at selected times to a pneumatic starter for an aeroplane motor.

The discharge from the tank is obviously governed by a valve, and considerable difficulty has been experienced in locating the operating means for the valve at a convenient position. The object of the present invention is to overcome this difficulty by the use of pneumatic valve-operating means which may easily be located wherever desired, inasmuch as changes in location require only different lengths of tubing.

The control device consists essentially of a fluid passage from the tank to a piston adapted to open the discharge valve. In the passage is inserted an auxiliary valve normally obstructing the same, and thus fluid entering the passage is ineffective on the main valve. The passage may, incidently, include the line which permanently connects the tank with the pressure gauge. A push button is mounted in alignment with the auxiliary valve and has a stem extending towards the valve. By pressure on the push button, the stem may be brought into engagement with the auxiliary valve to open the same and thus permit flow of pressure to the aforementioned piston which in turn opens the main valve at the tank.

The invention is fully disclosed by way of example in the following description and in the accompanying drawing, in which—

Figure 1 is a sectional view of the device at the operating end;

Fig. 2 is a sectional view of the apparatus at the tank; and

Fig. 3 is a section on the line 3—3 of Figure 2.

Reference to these views will now be made by use of like characters which are employed to designate corresponding parts throughout.

In Figures 2 and 3 is illustrated a tank 1 adapted to contain air or other fluid at a comparatively high pressure, for example, five hundred to six hundred pounds per square inch. A nipple 2 is threaded into the tank 1 and is formed with an annular valve seat 3. A valve member 4 is slidably and loosely mounted in the nipple and carries a composite seating portion 5 adapted to cover and close against the seat 3 in certain cases as will presently appear. The valve member is backed by a coil spring 6 which in turn is retained by an apertured nut 7 threaded into the inner end of the coupling.

A valve body member 8 is threaded on the outer end of the coupling 2, as shown in Figures 2 and 3, and is formed with a central chamber 9 adapted to communicate with the interior of the coupling 2 through the valve seat 3. A pin 10 is threaded through the body member 8 and normally holds the valve 4, 5, away from the seat 3 as clearly shown in Figure 3.

The body 8 is formed with another valve chamber 11 communicating with the chamber 9. One end of the chamber 11 has a line 12 coupled thereto. This line extends from a compressor or other suitable source of pressure fluid and is adapted to deliver fluid under pressure to the tank 1 in a manner which will presently be described. In the chamber 11 is slidably and loosely mounted a valve 13 normally held closed against the valve seat or reduced intake end 14 of the chamber by means of a light coil spring 15. The spring is backed by a coupling member 16 inserted in the other end of the chamber. Thus, the valve 13 is adapted to prevent a return of fluid from chamber 11 back into line 12, but when the pressure in the line exceeds the pressure in chamber 11 plus that of spring 15, the valve 13 is removed from its seating position shown in Figure 2, and the tank is charged.

The coupling 16 is connected by a line 17 to another valve body 18 disposed at the operator's station. The body has a branch 19 which conducts fluid under pressure to a gauge 20 mounted on an instrument board 21.

The body 8 has still another passage 22 connected by a line 23 to a device designed to be operated by the pressure fluid in the tank 1, such as a pneumatic starter for an internal combustion engine. The chamber 22 is adapted for communication with the chamber 9 and contains a slidably and loosely mounted valve 24 adapted to close against a seat 25 in the chamber 22 to obstruct such communication. The valve is normally held in closed position by the fluid pressure in the tank and a spring 26 which in turn is retained by a plug 27 threaded into one end of the cavity 22.

Another cavity 28 is formed in the body 8 in axial alignment with the passage 22. The cavity 28 contains a piston 29 having a larger face area than the valve 24, and from the piston extends a stem 30 engaging the valve member 24. Thus, when pressure is applied to the face of the piston by the means presently to be described, to an extent sufficient to overcome the spring 26 and the tank fluid pressure behind the valve, the valve seat is uncovered to permit pressure fluid to flow from the tank 1 through the chamber 9 and valve seat 25 into the line 23 whereby to operate the pressure actuated device connected to the line 23.

The body 18 is formed with a valve chamber 31 permanently affording communication between the line 17 and branch 19, so that the gauge 20 is at all times responsive to the pressure in the tank 1. The chamber 31 is formed intermediate its ends with a valve seat 32 adapted to be covered and closed by a valve member 33 loosely and slidably mounted in the chamber. The valve is normally held in closed position by the fluid pressure in the line 17 and the coil spring 34 which has one end abutting a plug 35 threaded into an end of the chamber.

At the other side of the valve seat, the body 18 is formed with a port 36 in permanent communication with the chamber, and a line 37 connects this port to the chamber 28 at the face of the piston 29. Thus, the establishment of pressure against the piston 29 to open the valve 24 depends on the opening of the valve 33.

A tube 38 is inserted in the body 18 at the unplugged end of the chamber 31 and is also passed through the panel 21 as shown in Figure 1. At the face of the panel, a housing or thimble 39 is threaded on the member 38. In order to open the valve 33 whenever desired, a push button 40 is slidably mounted in the housing 39 and has a stem 41 extending towards the valve 33 to such an extent that inward pressure on the push button brings the free end of the stem into engagement with the valve 33 and opens it.

When this operation is performed, the tank pressure existing in the line 17 through the means previously described is communicated through the port 36 and line 37 to the face of the piston 29, causing the valve 24 to uncover the valve seat 25 so that the device connected to the line 23 is operated.

The housing 39 contains a spring 42 engaging the push button 40 and normally moving it to its outward position so that the stem 41 is disengaged from the valve 33. A shoulder 43 formed on the stem engages a corresponding shoulder 44 within the tube 38 and prevents the stem from being entirely withdrawn from the body 18 by the action of the spring 42.

It will be seen that the end of the tube 38 within the body 18 has apertures 45 which communicate with a port 46 leading to the atmosphere. However, the pressure fluid passing through the valve seat 32 when the valve 33 is open is prevented from escaping to the atmosphere by the fact that the enlarged portion 47 of the stem 41 inward of the shoulder 43 covers the ports 45 before the stem engages the valve. In other words, the distance through which the stem must travel to cover the ports 46 is at least as great as the normal distance between the valve 33 and the nearer extremity of the stem as shown in Figure 1.

When the push button 40 is allowed to return to its normal position, the fluid pressure in the chamber 28 is reduced to atmospheric pressure through the line 37, port 36 and ports 45 and 46. In like manner, a port 48 is drilled through the body 8 to connect the chamber 28 behind the piston 29 to the atmosphere, so that there will be no compression of air resisting movement of the piston under pressure in chamber 28.

It will now be evident that the invention overcomes the inconveniences of a valve control for the tank 1 mounted directly on the tank or linked to the tank. Instead, the invention provides pneumatic means mounted at any desirable point remote from the tank and adapted to govern the outflow of pressure fluid from the tank.

In removing the body 8 from the coupling 2, the pin 10 is also withdrawn so that the valve 4 covers the seat 3 under the action of the spring 6 and fluid pressure. By reason of this device, no fluid is lost from the tank when the body 8 is removed for cleaning, repairs of any other reason.

Although a specific embodiment of the invention has been illustrated and described, it will be understood that various alterations in the details of construction may be made without departing from the scope of the invention, as indicated by the appended claims.

What I claim is:—

1. In combination, a body adapted for connection to a pressure receptacle and having a pressure fluid inlet and a pressure fluid outlet, a valve in said body normally closing said outlet, a pressure-operated device for opening said valve, a pair of conduits extending from said body, means interposed between said pair of conduits for subjecting said pressure-operated device to the pressure existing in said receptacle and thereby causing said valve to open, a second valve in said body normally closing said pressure fluid inlet, and means including a spring for maintaining said second valve closed even during the opening operation of said first named valve.

2. In combination, a body adapted for connection to a pressure receptacle and having a pressure fluid inlet and a pressure fluid outlet, a valve in said body normally closing said outlet, a pressure-operated device for opening said valve, means including a pair of conduits extending from said body for subjecting said pressure operated device to the pressure existing in said receptacle and thereby causing said valve to open, a second valve in said body normally closing said pressure fluid inlet, and means including a spring for preventing opening of said second valve except upon application of a pressure greater than that in said receptacle.

3. In combination, a body adapted for connection to a pressure receptacle and having a pressure fluid inlet and a pressure fluid outlet, a valve in said body normally closing said outlet, a fluid pressure-operated device for opening said valve, means for subjecting said fluid pressure-operated device to the pressure in said receptacle and thereby causing said valve to open, a second valve in said body normally closing said pressure fluid inlet, and means including a spring for preventing opening of said second valve except upon application of a pressure greater than that acting upon said first-named valve.

FRANK B. STOVER.